United States Patent [19]

Wesson et al.

[11] Patent Number: 5,085,494
[45] Date of Patent: Feb. 4, 1992

[54] FIBER OPTIC SPLICE MEANS AND METHOD

[75] Inventors: Laurence N. Wesson, Blue Bell; Nellie L. Cabato, Plymouth Meeting, both of Pa.

[73] Assignee: Aurora Optics, Inc., Blue Bell, Pa.

[21] Appl. No.: 605,534

[22] Filed: Oct. 29, 1990

[51] Int. Cl.$^5$ .............................................. G02B 6/26
[52] U.S. Cl. .......................................... 385/98; 385/99
[58] Field of Search ................ 350/96.2, 96.21, 96.23

[56] References Cited

U.S. PATENT DOCUMENTS

| | | | |
|---|---|---|---|
| 4,008,948 | 2/1977 | Dalgleish et al. | 350/96.21 |
| 4,257,674 | 3/1981 | Griffin et al. | 350/96.21 |
| 4,279,467 | 7/1981 | Borsuk et al. | 350/96.21 |
| 4,281,892 | 8/1981 | Sitabkhan | 350/96.21 |
| 4,336,977 | 6/1982 | Monaghan et al. | 350/96.2 |
| 4,413,880 | 11/1983 | Forrest et al. | 350/96.2 |
| 4,447,121 | 5/1984 | Cooper et al. | 350/96.21 |
| 4,494,822 | 1/1985 | Harvey | 350/96.21 |
| 4,647,150 | 3/1987 | De Santi et al. | 350/96.21 |
| 4,669,820 | 6/1987 | Ten Berge | 350/96.2 |
| 4,717,232 | 1/1988 | Priaroggia | 350/96.2 |
| 4,717,233 | 1/1988 | Szkaradnik | 350/96.21 |
| 4,729,625 | 5/1988 | Loscoe et al. | 350/96.21 |
| 4,784,459 | 11/1988 | Jenkins | 350/96.21 |
| 4,787,704 | 11/1988 | Knecht et al. | 350/96.21 |
| 4,807,959 | 2/1989 | Berkey | 350/96.21 |
| 4,815,810 | 3/1989 | Betzler et al. | 350/96.2 |
| 4,824,198 | 4/1989 | Anderton | 350/96.21 |
| 4,896,939 | 1/1990 | O'Brien | 350/96.23 |

*Primary Examiner*—William L. Sikes
*Assistant Examiner*—Galen J. Hansen
*Attorney, Agent, or Firm*—Jacob Trachtman

[57] ABSTRACT

A fiber optic cable splice means for splicing a fiber optic cable having a pair of fiber retaining elements with an opening for receiving the buffer casing at an end of a fiber optic cable with its bare optic fiber extending therefrom. A cavity within each element provides a fiber deflection chamber for protecting therein the bare optic fiber. The retaining elements are crimped for securing therewith the buffer casing and its optic fiber. A housing or tubular unit has end sections which receive therein a respective one of the retaining elements, and are crimped for securing the retaining elements therewith. An optical fiber alignment means is contained within the unit for aligning and optically joining together the ends of the optic fibers which extend from the retaining elements. The retaining elements may have an insert through which the optic fiber extends for securing the fiber by the crimping of the retaining elements. A retaining sleeve for each element also engages the strength member of the cable for being secured with the tubular unit by the crimping. The method of the invention for splicing fiber optic cables includes preparing the ends of cables to be spliced, inserting them into respective retaining elements, and crimping the retaining elements to secure the fiber optic cable therewith. The retaining elements are placed in the end sections of a housing and the end sections are crimped to secure the retaining elements in a fixed relationship to each other therewithin with their extending optic fibers aligned and engaged for providing signal transmission.

25 Claims, 2 Drawing Sheets

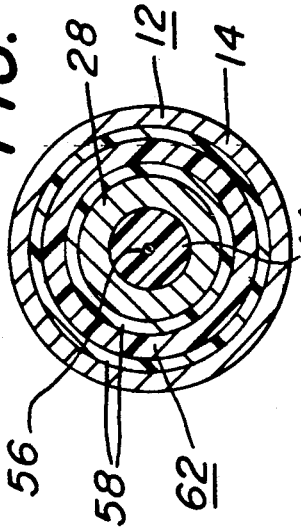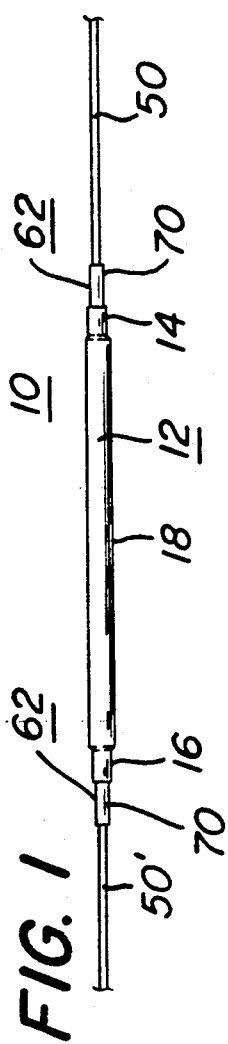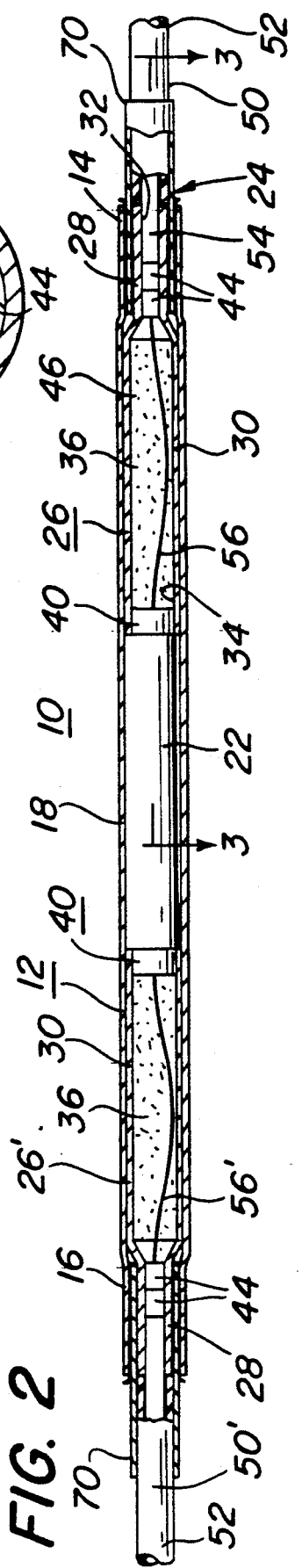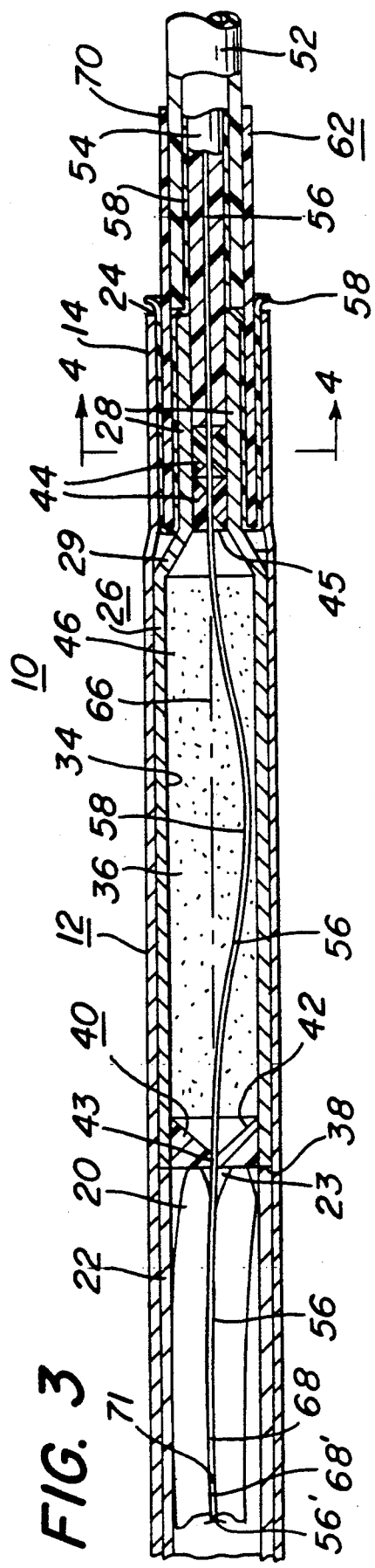

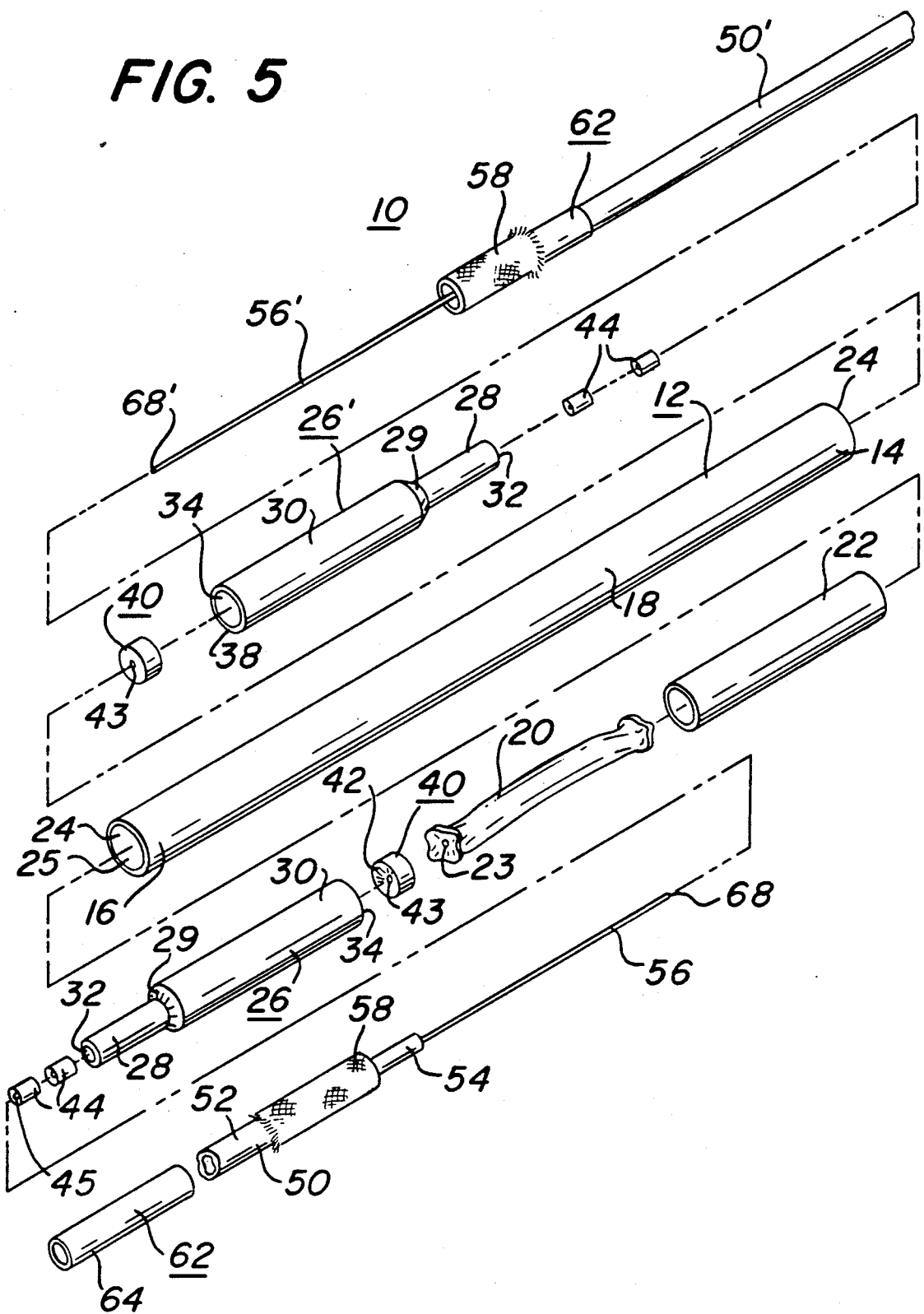

FIBER OPTIC SPLICE MEANS AND METHOD

The invention relates to a fiber optic cable splice means and method, and more particularly to a fiber optic cable splice means of miniature size, high strength and durability and a method of splicing fiber optic cable and optic fiber which can be quickly and easily carried out in the field with use of simple hand tools.

BACKGROUND OF THE INVENTION

Heretofore, fiber optic cable splicing means have been provided requiring a large housing usually cylindrical with a diameter of six inches and a length of one foot for receiving and storing therein several feet of coated fiber which was coiled on a storage rack. Low-loss splices of the individual fibers were contained within the housing and attached internally to the rack. Large dimensions within the housing were needed to provide bending radii for the optic fiber of a inch or more to reduce stress and prevent breakage. Another prior art method of splicing fiber optic cable allowed a housing of reduced size, but required the use of epoxy and electric power for curing the splice. The method required the mixing of epoxy under suitable temperature and environmental conditions, and a cure time to provide a strong bond. The use of materials such as an epoxy which may have been stored and allowed to deteriorate may provide bonds which are subject to failure under moderate tensile load or extreme temperature cycling conditions. Also splicing means and methods which use mechanical clamping of aligned fibers rather than epoxy, result in terminations having relatively low strength, and a high probability that tensile loads on the cable with a compact cable splice will be transmitted to the fiber inside and result in failure. To advance the art, it is therefore, desirable to provide a fiber optic cable splice means which is small, approaching the size of typical fiber splices which are approximately 0.25 inch by 1.50 inches. Such a splice means must achieve good retention of the strength member of the cable, while also providing low insertion loss for the signals transmitted. It is also desirable to provide a cable splice means and method which allows a cable to be quickly and easily spliced in the field using only hand tools and requiring no electric power or chemical adhesives. Such means and method is of great importance for installations in confined locations, as for example, inside aircraft where the miniature size and simple procedure is a necessity.

SUMMARY OF THE INVENTION

It is therefore a primary object of the invention to provide a new and improved fiber optic cable splice means and method which provides a cable splice means of miniature size, and has high strength and durability, and which may be made quickly and easily in the field even under adverse conditions using only simple mechanical hand tools.

Another object of the invention is to provide a new and improved fiber optic cable splice means and method providing a combination of cable and fiber splice functions in a miniature housing.

Another object of the invention is to provide a new and improved fiber optic cable splice means and method having several components which are easily assembled and secured in the field.

Another object of the invention is to provide a new and improved fiber optic cable splice means and method with a housing which securely retains the ends of cables being spliced without transmitting stress to the optic fibers within the housing.

Another object of the invention is to provide a new and improved fiber optic cable splice means and method which provides for termination of both cable and fiber in a single splice.

Another object of the invention is to provide a new and improved fiber optic cable splice means and method which provides for crimp attachment of the housing and components to the cable and the bare fiber.

Another object of the invention is to provide a new and improved fiber optic cable splice means and method which provides for attachment of the strength member of the cable to the same miniature housing containing the optic fiber splice.

Another object of the invention is to provide a new and improved fiber optic cable splice means and method which does not require use of chemical means such as epoxies.

Another object of the invention is to provide a new and improved fiber optic cable splice means and method which restores the cable strength of the spliced cable utilizing a miniature housing.

Another object of the invention is to provide a new and improved fiber optic cable splice means and method having low signal transmission loss therethrough.

Another object of the invention is to provide a new and improved fiber optic cable splice means and method having a housing which secures therewith the strength member and buffer casing of a cable and also the bare fiber for assuring maintenance of good retention and transmission properties through the spliced fibers.

Another object of the invention is to provide a new and improved fiber optic cable splice means and method providing means for protecting the optic fiber from humidity, temperature and vibration within the housing and assuring alignment and connection between the fiber ends for low signal insertion loss.

Another object of the invention is to provide a new and improved fiber optic cable splice means and method which may be quickly and easily installed in confined locations and even under adverse conditions.

Another object of the invention is to provide a new and improved fiber optic cable splice means which is readily and inexpensively made, and is of high durability and reliability.

The above objects as well as many other objects and advantages of the invention are achieved by providing a fiber optic cable splice means for splicing a fiber optic cable having a protective buffer casing and which comprises a pair of fiber retaining elements each having first and second portions. The first portion of each element has an end with an opening for receiving an end of a fiber optic cable with its protective buffer casing exposed and its bare optic fiber extending therefrom which is to be spliced. The second portion of each element has an end with an opening providing for the optic fiber to extend externally therethrough. Each retaining element has a cavity extending between the openings of its first and second portions and provides a fiber deflection chamber for receiving and protecting therein the optic fiber without its buffer casing. The first portions of the retaining elements are deformable by crimping for securing and retaining therewith the buffer casing and its optic fiber.

A housing comprises an elongated tubular unit having first and second end sections and a central section. The tubular unit has an opening in each end section for receiving therein a respective one of the pair of retaining elements. Each retaining element is positioned within an end of the tubular unit with its second portion positioned inwardly. The end sections of the tubular unit are deformable by crimping for securing the first portions of each of the retaining elements with the tubular unit. The tubular unit includes an optical fiber alignment means within its central section for receiving therein and aligning and optically joining together the ends of the optic fibers which extend externally from the second portions of the retaining elements.

Each of the retaining elements may be provided with an insert within its first portion spaced from its end comprising an abutment for the end of the buffer casing received through the opening of its retaining element. The insert has an opening for receiving therethrough the optic fiber without its buffer casing. The insert is also compressible for securing the optic fiber extending therethrough with the retaining element by the crimping of the first portion of its retaining element. Each of the second portions of the retaining elements has a guide means enclosing the opening of its end. The guide means has an opening for guiding therethrough and aligning the end of the optic fiber which extends externally thereof for being received into the alignment means of the tubular unit. The deflection chamber of each of the retaining elements has contained therein a semi-liquid material such as a silicone gel of the proper viscosity for protecting the optic fiber extending therethrough. Each of the retaining elements has a retaining sleeve for being positioned about its first portion and over a strength member of the fiber optic cable. The strength member is positioned between the first portion of the retaining element and its retaining sleeve for being secured therewithin by the crimping of the end sections of the tubular unit.

The method of the invention for splicing fiber optic cables which have an optic fiber with a protective buffer casing includes the steps of exposing the buffer casing at the ends of each of first and second optic fiber cables which are to be spliced, and removing a portion of the buffer casing at the end of each of the first and second fiber optic cables so that an exposed optic fiber of the cable extends from the buffer casing providing the fiber ends which are to be spliced. The ends of each of the fiber optic cables are inserted into a first opening of a respective one of the first and second retaining elements, so that at least a portion of the exposed buffer casing is received therein and its optic fiber without its buffer casing passes through its retaining element and extends externally from a second opening of its retaining element. At least a portion of each of the retaining elements is crimped to compress within the retaining element the inserted buffer casing to secure the fiber optic cable with its retaining element, and the first and second retaining elements are secured in a fixed relationship to each other with their extending optic fibers being aligned and their ends maintained in engagement for providing signal transmission therethrough.

The method also includes the step of providing a compressible insert in the retaining element so that when the cable with its exposed buffer casing is inserted into the retaining element it abuts the insert, and the extending fiber without its buffer casing passes through an opening in the insert, so that when the first portions of the retaining elements are crimped, the inserts are compressed engaging and firmly securing the optic fiber with the retaining element. The optic fiber which extends from the insert toward the second opening of its retaining element is passed through a deflection chamber containing a semi-liquid material such as a silicon gel for protecting therein the optic fiber without its buffer casing. The method also provides for the retaining elements having a guide means at its second opening and for the optic fiber being guided by the guide means through its opening to extend externally and in alignment from the retaining element. The first and second retaining elements are received within the ends of a tubular unit for securing them in fixed relationship to each other with their extending optic fibers being aligned by being received within an aligning means within the unit for maintaining engagement of their ends for providing signal transmission therethrough. The method also includes a step of cleaving the optic fibers extending from the second end of each retaining element to be of a length which causes the optic fiber to be deflected within the deflection chamber of its retaining element for maintaining engagement of the ends of the fibers within the alignment means.

The foregoing and other objects of the invention will become more apparent as the following detailed description is read in conjunction with the drawing, in which;

BRIEF DESCRIPTION OF THE DRAWING

FIG. 1 is an elevational view of a fiber optic cable splice means 10 embodying the invention, FIG. 2 is an enlarged view of FIG. 1 with portions shown in section, FIG. 3 is an enlarged sectional view taken on the line 3—3 of FIG. 2, FIG. 4 is an enlarged sectional view taken on a line 4—4 of FIG. 3, and FIG. 5 is an exploded perspective view of the device shown in FIG. 1 prior to the preassembly of its components.

Like reference numerals designate like parts throughout the several views.

DETAILED DESCRIPTION

A fiber optic cable splice 10 of the invention is shown in assembled form in FIGS. 1 to 4 inclusive. A housing comprising a tubular unit 12 has first and second end sections 14 and 16 and a central portion 18 and is preferably made of a metallic material such as stainless steel which is crimpable for securing its end sections 14 and 16 with other components of the splice means 10. The central portion 18 of the tubular unit 12 is preassembled to have secured therein a fiber aligning means 20 contained within a tubular sleeve 22 positioned intermediate its end sections 14, 16. The alignment means 20 may be any one of the well known devices including the four glass rod alignment device and other devices shown in U.S. Pat. No. 4,192,575, No. 4,201,443, No. 4,225,214 and No. 4,717,233, or any other suitable device for aligning and providing contact between the cleaved ends of the optic fibers of the fiber optic cables being spliced (see FIG. 3). As is customary, the alignment means 20 is provided with a pre-installed quantity of index matching fluid into which the ends of the optic fibers are received for minimizing signal insertion loss. The end sections 14 and 16 of the housing or tubular unit 12 each have an opening 24 into a bore cavity 25 extending between the end sections 14 and 16.

A pair of fiber optic cable retaining elements 26, 26' are each respectively received within the first and second end sections 14, 16 of the housing or tubular unit 12. As shown in FIGS. 2 and 3, each of the retaining units 26, 26' has a first cylindrical portion 28 which is joined by an intermediate conical section 29 to a second larger cylindrical portion 30. As clearly shown in FIG. 5, the first cylindrical portion 28 has an opening 32 extending therethrough to the conical section 29 and enlarges to an opening 34 of greater diameter within the second portion 30 forming a deflection chamber 36 therein. The opening 34 at the end 38 of the portion 30 of each of the retaining elements 26, 26' is enclosed by an optic fiber guide means 40 of cylindrical form, as shown in FIGS. 3 and 5. The inward surface 42 of the guide means 40 has a conical surface leading to a central opening 43 for guiding and directing the end of its bare optic fiber which is to be received therethrough.

The portion 28 of the retaining element 26, 26' may also receive within its opening 32 at a location proximate to the conical section 29, one or more cylindrical inserts 44, preferably of a plastic material which is compressible. Each insert 44 has a central opening 45 for receiving therethrough a bare optic fiber which extends into the chamber 36. The chamber 36 of each of the retaining elements 26, 26' is preferably filled with a semi-viscous liquid or gel material 46 for protecting the bare fiber extending therethrough against vibration, stress corrosion, heat, and humidity which may adversely affect the optic fibers 56, 56'.

The fiber optic cable splice means 10 is utilized to splice a fiber optic cable 50 with a fiber optic cable 50'. The cables 50 and 50, may be of the type having an plastic outer jacket 52 (FIGS. 2 and 3), a buffer coating or casing 54 and a central optic fiber 56. Such cables are also usually provided with a strength member 58, such as a Kevlar braid, under the outer jacket 52 and extending around and along the outer surface of the buffer casing 54 for providing tensile strength to the cable. The end portions of the cables 50 and 50' which are to be spliced are trimmed to remove any portion of the cable which may be damaged. The outer jacket 52 of the cable is then stripped from the cable along a predetermined length, and the strength member 58 which may be present is folded back over the outer jacket 52 and away from the buffer casing 54. The buffer casing 54 is then removed leaving a small portion of the buffer casing 54 extending from the end of the remaining outer jacket 52 and providing a predetermined length of exposed optic fiber 56. The exposed portion of the buffer casing 54 is of a length which allows it to be fully received into the opening 32 of its retaining element 26, 26' with the end of the cable outer jacket 52 abutting the end of the portion 28 of its retaining element 26, 26'.

A protective retaining sleeve 62 made of a material such as PES plastic, having a high friction surface, is secured within each of the openings 24 at the end sections 14 and 16 occupying an annular space between the outer surface of the portion 28 of the retaining element 26, 26' and the inside surface of the opening 24 at the end sections 14 and 16 of the tubular unit 12. The strength member 58 is also received into the annular space and extends first over the outer surface of the portion 28 of its retaining element 26, 26' and then folds over to lie between the outer surface 64 of the retaining sleeve 62 and the inner surface of the opening 24 at the end sections 14, 16 of the tubular unit 12.

As seen in FIGS. 2 and 3, the bare optic fiber 56, which passes through the inserts 44, extends into the deflection chamber 36 initially along its central axis 66 while its intermediate portion 57 is deflected from the axis 66 before passing along the central axis 66 through the opening 43 in the guide means 40. The guide means 40 aligns the fiber to extend externally therefrom into the opening 23 of the optic fiber alignment means 20. The length provided for the bare optic fiber 56, 56' measured from the end of the buffer casing 54 of its cable 50, 50', or preferably its extension out of the opening 34 at the end 38 of its retaining element 26, 26', assures an abutting contact 71 of the cleaved end 68 with the cleaved end 68' of the bare optic fibers 56, 56' which extend from the cables 50, 50'. The index matching fluid or oil contained within the alignment means 20 also assures transmission of signals with low loss through the abutting ends 68, 68' at contact 71. The bare fibers 56 and 56' have a predetermined length to provide a slight deflection of the fibers 56, 56' at 57 within the deflection chamber 36. This takes into account any possible variations in dimension and conditions of the cable splice means 10 for assuring the desired contact between the abutting ends 68, 68' of the fibers 56, 56'. Since the optic fibers 56, 56' tend to assume a linear configuration, the deflection at 57 results in a force which urges the ends 68, 68' toward each other and maintains the contact between the ends 68, 68' of the fibers even under adverse condition of vibration, temperature variations and other such conditions.

The cables 50 and 50' are securely retained within their retaining elements 26, 26' by the crimping of their portions 28 which provides a compressive force on the buffer coating or casing 54 of each of the cables 50 and 50' as well as a retaining force directly exerted on the bare optic fibers 56, 56' when the compressive force exerted on the inserts 44 are transmitted thereby to firmly grip the optic fiber 56, 56' extending therethrough. Use of the inserts 44 is limited and conditioned by the fragility of the optic fiber being spliced. Since the fragility of the optic fiber increases with the decrease of its diameter, the amount of compressive force which may be exerted thereon without harm to the fiber depends upon the optic fiber being spliced. For fibers of sufficient strength, several inserts 44 as illustrated, may be utilized for obtaining greater retention of the optic fiber while also providing better distribution of compressive force to avoid damage.

The end sections 14, 16 of the tubular unit 12 which preferably is of stainless steel, are also crimped for firmly securing therein the respective retaining elements 26, 26' and their cables 50 and 50'. The strength member 58, which is received into the end sections 14, and 16 of the tubular unit 12 about its retaining sleeve 62, is also firmly secured with an end section 14, 16 of the tubular unit 12 by the compressive force exerted by the crimped end sections 14 and 16. The retaining sleeve 62, by providing a high friction surface assures that the strength member is firmly retained, while the trailing portion 70 of the sleeve 62 (FIGS. 1 and 2) which extends over the outer jacket 52 of its cables 50 and 50' allows limited bending of the cables extending from the cable splice means 10, and serves to protect the extending portions of the cables against excessive bending stresses.

In the case where the cables being spliced do not have a strength member 58, the retaining sleeve 62 may be dimensioned to adequately fill the space which is not occupied by the strength member. Alternatively, the diameter of the portion 28 of the retaining element may be increased to take up such space otherwise required by the strength members 58 for allowing the elements 26, 26' to be firmly secured with the tubular unit 12 by the crimping of its end sections 14, 16.

The FIG. 5 is an in exploded perspective view illustrating the sub-components of the cable fiber optic splice 10 prior to their assembly. The sub-components of the cable splice means 10, are preassembled to provide as its several components comprising the housing or tubular unit 12, a pair of cable retaining elements 26 and 26', and a pair of retaining sleeves 62. The component of the preassembled tubular unit 12 is provided by an elongated tube 12 of constant cross sectional diameter which has secured within its center portion 18, the fiber alignment means 20 housed within its tubular sleeve 22. The alignment means 20 is also provided with index matching oil as previously described. Each of the retaining elements 26 and 26' is preassembled to include such inserts 44 which are to be utilized within the portion 28 proximate to the conical section 29 connecting with the portion 30. The chamber 36 within the portion 30 is filled with the semi-liquid or gel material 46 for protecting the bare optic fiber, while having the opening 34 at its end 38 enclosed by the guide means 40. The preassembled components for use in providing the cable fiber optic splice means 10 are thus few in number and simple to make and preassemble. The cable splice means 10 is simple in form which readily allows its miniaturization, while at the same time permits quick and easy splicing of cables in the field with the use of simple hand tools and without requiring electric power or chemical substances.

In performing the method of splicing a pair of fiber optic cables 50 and 50', the ends of the cables which are to be spliced are first trimmed to remove any damaged portions and a retaining sleeve 62 is slipped over each of the ends of the cables 50, 50' for later use during the splicing process. The outer covering or jacket 52 of each of the cables 50, 50' is removed exposing where present, its strength member 58. The strength member 58 is folded back to expose the buffer coating or casing 54 of each cable. Leaving a small portion of the buffer casing 54, the remainder of the buffer casing 54 to the end of the cable 50, 50' is removed exposing their respective optic fibers 56, 56'. The prepared ends of the cables 50, 50' are each secured with one of the retaining elements 26, 26'. This is accomplished by inserting the optic fiber 56, 56' into the opening 32 of the portion 28 of its retaining element 26, 26' to extend into and through the portions 28 and 30 and externally from the end 38 of the portion 30. In doing this, the optic fiber passes through the openings 45 of the inserts 44, extends through the semi-liquid or gel material 46 in the deflection chamber 36 and is guided by the cone shaped surface 42 of the guide means 40 into and through its opening 43. The extending fibers 56, 56' of the cables 50, 50' have their ends 68, 68' cleaved to provide a predetermined length, preferably measured from the end 38 of their respective retaining elements 26, 26'. The insertion of the prepared ends of the cables 50 and 50' into retaining elements 26, 26' results in the exposed portion of the buffer casing 54 being received within the opening 32 of the portion 28 until the end of the cable jacket 52 abuts the end of portion 28, and the end of the buffer casing abuts the end of an insert 44 within the portion 28 (see FIG. 2). The portions 28 of the retaining elements 26, 26' are crimped by the use of appropriate crimping hand tools providing a compressive force upon the buffer casings 54 of the cables 50 and 50' to firmly secure and retain them with their retaining elements 26, 26'. Compressive force which is also exerted on the plastic inserts 44 is transmitted to the bare optic fiber 56, 56' passing through their opening 45 for firmly securing and positioning the fiber 56, 56' within its element 26, 26'. The use of inserts 44 as previously noted is conditioned upon the force which may be exerted upon the bare optic fiber without damage due to the delicate nature of fibers of very small diameter.

The retaining elements 26, 26' are now in condition for being received into the openings 24 at opposite end sections 14, 16 of the tubular unit 12. This is accomplished by inserting the enlarged portions 30 of the elements 26, 26' into respective openings 24 of the end sections 14 and 16. Each portion 30 has its optic fiber 56, 56' extending therefrom in a centered aligned relationship by passing through the central opening 43 of its guide means 40. As each of the retaining elements 26, 26' is slid into its respective end sections 14, 16 of the unit 12, the on opposite sides of the alignment means 20. When the retaining elements 26, 26' are fully inserted their ends 38 respectively abut opposite ends of the tubular sleeve 22 containing the alignment means 20. The fibers 56, 56' are aligned as shown in FIG. 3 with their cleaved ends 68, 68' in abutment at contact 71 and immersed in the index matching fluid for providing low-loss signal transmission. The bare optic fibers 56, 56' are with a measured length which causes the optic fibers 56, 56' within the deflection chamber 36 to be deflected from alignment along axis 66 as shown in FIG. 3. Such deflection of the fibers 56, 56', which have a tendency to assume a linear configuration, results in a pressure being exerted at the contact 71 of the ends 68, 68' of the fibers 56, 56' serving to maintain their engagement. The deflection of the fiber 56, 56' provides for variations in the size and configuration of the components or their assembly in the making of the splice, as well as compensating for changes in dimensions due to temperature and other conditions to which the cable splice means 10 may be subjected.

The strength members 58 of each of the cables 50 and 50' is inserted into a respective opening 24 at the end sections 14 and 16 of the unit 12 by movement of the retaining sleeve 62 over its strength member 58 into the annular space provided between the outer surface of the portion 28 of the retaining elements 26, 26' and the inner surface of the tubular unit 12 while the strength member 58 is folded back over the outer surface 64 of the retaining sleeve 62. This results in the strength member being positioned over the outer surface of the portion 28 and folded back to be over the outer surface of the retaining sleeve 62. The retaining sleeve 62 is moved into the annular space until it is seated against the tapered or conical section 29 joining the portions 28 and 30 of the retaining elements 26, 26'. The excess portion of the folded strength member 58 extending out of the end sections 14 and 16 of the tubular unit 12 may be trimmed at this time. The retaining elements 26, 26', the strength member 58 of the cables 50 and respective end sections 14 and 16 of the tubular unit 12 with the crimping of the end sections 14 and 16 by the use of an appropriate hand crimping tool. The end sections 14 and 16 of the tubular unit 12 after being crimped are shown in FIGS. 1, 2, and 3.

From the above description, it is apparent that the invention provides a fiber optic cable splicing means and method which can provide a fiber optic cable splicing means of miniature dimensions for securely and firmly retaining the cables being spliced and assuring signal transmission with low loss characteristics. The components of the splicing means which are simple in form may be inexpensively and readily made and are of high durability and reliability. The method of making the fiber optic cable splice requires use of few components which are quickly and easily applied for completing a splice of fiber optic cable in the field and under conditions which may be adverse without requiring electrically powered means, chemical substances, or other such material, but only with the use of simple hand tools.

The present invention may be embodied and carried out in other forms without departing from the spirit or essential attributes thereof, and, accordingly reference should be made to appended claims, rather than to the foregoing specifications as indicating the scope of the invention.

What is claimed is:

1. A fiber optic splice means for splicing a fiber optic cable having an optic fiber with a protective buffer casing comprising a pair of fiber retaining elements each having first and second portions, the first portion of each element having an end with an opening for receiving an end of an optic fiber with its protective buffer casing of a cable which is to be spliced while the second portion of each element has an end with an opening for having the optic fiber without its buffer casing extend externally therethrough, each retaining element has a cavity which extends between the openings of its first and second portions and provides a fiber deflection chamber therewithin for receiving and protecting therein the optic fiber without its buffer casing, the first portions of the retaining elements are deformable by crimping for securing and retaining therewith the optic fiber and its buffer casing received therewithin; and an elongated tubular unit having first and second end sections and a central section, each end section having an opening for receiving therein a respective one of the pair of retaining elements with its second portion positioned inwardly and each end section of the tubular unit being deformable by crimping for securing each of the first portions of its retaining element with the tubular unit, and the tubular unit has an optical fiber alignment means within its central section for receiving thereinto the optic fibers which extend externally from the second portions of the retaining elements for aligning and optically joining together their ends; each of the second portions of the retaining elements has a guide means enclosing the opening of its end, and each guide means has an opening for guiding therethrough and aligning the end of the optic fiber for extending externally thereof and being received into the alignment means of the tubular unit.

2. A fiber optic splice means for splicing a fiber optic cable having an optic fiber with a protective buffer casing comprising a pair of fiber retaining element search having first and second portions, the first portion of each element having an end with an opening for receiving an end of an optic fiber with its protective buffer casing of a cable which is to be spliced while the second portion of each element has an end with an opening for having the optic fiber without its buffer casing extend externally therethrough, each of the retaining elements has an insert within its first portion spaced from its end providing an abutment for the end of the optic fiber and its buffer casing received through the opening, the insert has an opening for receiving therethrough the optic fiber without its buffer casing and is compressible for engaging and firmly securing the optic fiber received therethrough with the retaining element by the crimping of the first portion of its retaining element, each retaining element has a cavity which extends between the openings of its first and second portions and provides a fiber deflection chamber therewithin for receiving and protecting therein the optic fiber without its buffer casing, the first portions of the retaining elements are deformable by crimping for securing and retaining therewith the optic fiber and its buffer casing received therewithin; and an elongated tubular unit having first and second end sections and a central section, each end section having an opening for receiving therein a respective one of the pair of retaining elements with its second portion positioned inwardly and each end section of the tubular unit being deformable by crimping for securing each of the first portion of its retaining element with the tubular unit, and the tubular unit has an optical fiber alignment means within its central section for receiving thereinto the optic fibers which extend externally from the second portions of the retaining elements for aligning and optically joining together their ends.

3. The splice means of claim 2, in which each of the second portions of the retaining elements has a guide means enclosing the opening of its end, and each guide means has an opening for guiding therethrough and aligning the end of the optic fiber for extending externally thereof and being received into the alignment means of the tubular unit.

4. The splice means of claim 3, in which the deflection chamber of each of the retaining elements has contained therein a semi-fluid material for protecting the optic fiber extending therethrough.

5. A fiber optic splice means for splicing a fiber optic cable having an optic fiber with a protective buffer casing comprising a pair of fiber retaining elements each having first and second portions, the first portion of each element having an end with an opening for receiving an end of an optic fiber with its protective buffer casing of a cable which is to be spliced while the second portion of each element has an end with an opening for having the optic fiber without its buffer casing extend externally therethrough, each retaining element has a cavity which extends between the openings of its first and second portions and provides a fiber deflection chamber therewithin for receiving and protecting therein the optic fiber without its buffer casing, the first portions of the retaining elements are deformable by crimping for securing and retaining therewith the optic fiber and its buffer casing received therewithin; and an elongated tubular unit having first and second end sections and a central section, each end section having an opening for receiving therein a respective one of the pair of retaining elements with its second portion positioned inwardly and each end section of the tubular unit being deformable by crimping for securing each of the first portions of its retaining element with the tubular unit, and the tubular unit has an optical fiber alignment means within its central section for receiving thereinto the optic fibers which extend externally from the second portions of the retaining elements for aligning and optically joining together their ends, the fiber optic cable has a strength member extending along the buffer casing of the fiber and each of the retaining elements has a retaining sleeve for being positioned about and over its first portion and over a strength member of the fiber optic cable which strength member is positioned between the first portion of the retaining element and its retaining sleeve for being secured therewithin by the crimping of the end sections of the tubular unit.

6. The splice means of claim 5, in which the openings of the end sections of the tubular unit are each provided for receiving therein one of the retaining elements with its retaining sleeve about its first portion and the strength member positioned between the first portion of its retaining element and its retaining sleeve and folded back over the retaining sleeve to extend between the retaining sleeve and the tubular unit for being firmly secured therewith by the crimping of the end sections of the tubular unit.

7. The splice means of claim 3, in which the fiber optic cable has a strength member extending along the buffer casing of the fiber and each of the retaining elements has a retaining sleeve for being positioned about an dover its first portion and over a strength member of the fiber optic cable which strength member is positioned between the first portion of the retaining element and its retaining sleeve for being secured therewithin by the crimping of the end sections of the tubular unit.

8. The splice means of claim 7, in which the fiber retaining elements each have a cylindrical configuration with its first portion having a cross sectional size which is reduced with respect to that of its second portion, and the openings of the end sections of the tubular unit are sized prior to being crimped to slidingly receive therein the second portions of the retaining elements while providing a space between the first portions and the tubular unit for receiving therein a respective one of the retaining elements with its retaining sleeve positioned about its first portion and over its strength member.

9. The splice means of claim 8, in which the deflection chamber of each of the retaining elements has contained therein a semi-liquid material for protecting the optic fiber extending therethrough, the retaining elements each have a circular cross section with the first portion having a cross sectional diameter which is smaller than that of the second portion, and the tubular unit has a circular cylindrical configuration with each of its opening shaving a diameter sized prior to being crimped for receiving therein one of the retaining elements with its retaining sleeve about its first portion and with the strength member positioned between the first portion of its retaining element and its retaining sleeve and being folded back over the retaining sleeve to extend between the retaining sleeve and the tubular unit for being firmly secured therewith by the crimping of the end sections of the tubular unit, and the retaining elements being received within the tubular unit with the ends of each of their second portions respectively engaging oppose sides of the fiber alignment means of the tubular unit.

10. In a fiber optic splice means for splicing a fiber optic cable having an optic fiber with a protective buffer casing, a fiber optic cable retaining element having first and second portions, the first portion of the element having an end with an opening for receiving an end of an optic fiber with its protective buffer casing of a fiber optic cable which is to be spliced while the second portion of the element has an end with an opening for having the optic fiber without its buffer casing extend externally therethrough, the retaining element has a cavity which extends between the openings of its first and second portions and provides a fiber deflection chamber therewithin for receiving therein the optic fiber without its buffer casing, and the first portion of the retaining element is deformable by crimping for securely retaining therewith the optic fiber and its buffer casing of the cable received therewithin; the second portion of the retaining element has a guide means enclosing the opening of its end, and the guide means has an opening for guiding therethrough and directing the end of the optic fiber for extending externally of the retaining element.

11. In a fiber optic splice means for splicing a fiber optic cable having an optic fiber with a protective buffer casing, a fiber optic cable retaining element having first and second portions, the first portion of the element having an end with an opening for receiving an end of an optic fiber with its protective buffer casing of a fiber optic cable which is to be spliced while the second portion of the element has an end with an opening for having the optic fiber without its buffer casing extend externally therethrough, the retaining element has a cavity which extends between the openings of its first and second portions and provides a fiber deflection chamber therewithin for receiving therein the optic fiber without its buffer casing, and the first portion of the retaining element is deformable by crimping for securely retaining therewith the optic fiber and its buffer casing of the cable received therewithin; the retaining element has an insert within its first portion spaced from its end providing an abutment for the end of the optic fiber with its buffer casing received through the opening of the first portion, and the insert has an opening for receiving therethorugh the optic fiber without its buffer casing and is compressible for engaging and firmly securing therein the optic fiber received therethrough by the crimping of the first portion of the retaining element.

12. The means of claim 11, in which the second portion of the retaining element has a guide means enclosing the opening of its end, and the guide means has an opening for guiding therethrough and directing the end of the optic fiber for extending externally of the retaining element.

13. The means of claim 12, in which the deflection chamber of the retaining element has contained therein a semi-liquid material for protecting the optic fiber extending therethrough.

14. The means of claim 13, in which the fiber optic cable has a strength member along its buffer casing and the retaining element has a retaining sleeve for being positioned about its first portion and over a strength member of the fiber optic cable for firmly securing the strength member with the retaining element.

15. The means of claim 13, in which fiber retaining element has a circular cylindrical configuration with its first portion having a cross sectional diameter which is smaller than that of its second portion, and the retaining sleeve has a circular cylindrical configuration sized to be received about the first portion for firmly securing the strength member of the fiber optic cable with the retaining element.

16. A method of splicing an fiber optic cable comprising an optic fiber with a protective buffer casing including the steps of:

(a) exposing the buffer casing at the ends of each of first and second fiber optic cables which are to be spliced;

(b) removing a portion of the buffer casing at the end of each of the first and second fiber optic cables so that an optic fiber of the cable extends from the buffer casing exposing the fiber ends which are to be spliced;

(c) inserting the end of each of the fiber optic cables into a first opening of a respective one of first and second retaining elements so that at least a portion of the exposed buffer casing is received therein and its optic fiber without its buffer casing extends through its retaining element, and passing the end of the optic fiber through an opening of a guide means at the second end of the retaining element so that the optic fiber extends externally from its retaining element;

(d) crimping at least a portion of each of the retaining elements to compress therein the inserted buffer casing and firmly secure the fiber optic cable with its retaining element, and (e) securing the first and second retaining elements in fixed relationship to each other with their extending optic fibers aligned and their ends maintained in engagement for providing signal transmission therethrough.

17. A method of splicing an fiber optic cable comprising an optic fiber with a protective buffer casing including the steps of:

(a) exposing the buffer casing at the ends of each of first and second fiber optic cables which are to be spliced;

(b) removing a portion of the buffer casing at the end of each of the first and second fiber optic cables so that an optic fiber of the cable extends from the buffer casing exposing the fiber ends which are to be spliced;

(c) inserting the end of each of the fiber optic cables into a first opening of a respective one of first and second retaining elements so that at least a portion of the exposed buffer casing is received therein to abut a compressible insert within the retaining element and its optic fiber without its buffer casing is passed through an opening in the insert and extends externally from a second opening of its retaining element;

(d) crimping at least a portion of each of the retaining elements to compress therein the inserted buffer casing and firmly secure the fiber optic cable with its retaining element and to compress the insert for engaging and firmly securing the optic fiber with the retaining element, and (e) securing the first and second retaining elements in fixed relationship to each other with their extending optic fibers aligned and their ends maintained in engagement for providing signal transmission therethrough.

18. The method of claim 17, in which in step (c) each of the retaining elements has a deflection chamber containing a semi-liquid material through which the optic fiber without its buffer casing is passed after extending through the opening of the insert.

19. The method of claim 18, in which in step (c) each of the retaining elements has a guide means at its second opening enclosing the deflection chamber and having an opening therethrough for guiding the optic fiber to extend externally from the retaining element.

20. The method of claim 19, in which the fiber optic cable has a strength member along its buffer casing and after step (d), and includes the step in which a strength member of each of the fiber optic cables is positioned to overlie its respective retaining element, and a retaining sleeve is positioned about the retaining element over the strength member for firmly securing the strength member and its cable with its retaining element.

21. The method of claim 19, in which in step (e) the retaining elements are each received into and respectively secured at opposite ends of a tubular unit, and includes the step in which their extending optic fibers are respectively received into opposite ends of an alignment means within the tubular unit intermediate its ends.

22. The method claim 21, in which in step (d) the ends of the tubular unit are crimped for securing and retaining therein in fixed relationship to their respective retaining elements.

23. The method of claim 22, in after step (d) which each of the ends of the optic fibers is cleaved to provide for its extension from the second opening of its retaining element to have a length which causes the optic fiber to be deflected within the deflection chamber of its retaining element for maintaining the engagement of the ends of the fibers within the alignment means.

24. The method of claim 20, in which the fiber optic cable has a strength member over its buffer casing and after step (d), and includes the step in which the strength member and its retaining sleeve are positioned over the crimped portion of its retaining element and the strength member is folded back over the retaining sleeve and in step (e) the first and second retaining elements with their retaining sleeves are respectively received into opposite ends of a tubular unit, and the strength member which is folded back lies between the retaining sleeve and the tubular unit, the extending optic fibers are received into opposite ends of an alignment means within the tubular unit positioned intermediate its ends, and each of the ends of the tubular unit is crimped to secure therewith the retaining elements, their retaining sleeves and the strength members received therein.

25. The method of claim 24, in which after step (d) each of the ends of the optic fibers is cleaved to provide for its extension from the second opening of its retaining element to be of a length which causes the optic fiber to be deflected within the deflection chamber of its retaining element for maintaining the engagement of the ends of the fibers within the alignment means.

* * * * *